United States Patent [19]

Dugge

[11] 4,398,557

[45] Aug. 16, 1983

[54] COMBINATION VACUUM RELIEF VALVE AND PRESSURE RELIEF VALVE

[75] Inventor: Richard H. Dugge, St. Louis, Mo.

[73] Assignee: ACF Industries, Incorporated, New York, N.Y.

[21] Appl. No.: 196,813

[22] Filed: Oct. 14, 1980

[51] Int. Cl.³ .................................... F16K 17/196
[52] U.S. Cl. ........................... 137/493.9; 137/350;
137/526; 137/588
[58] Field of Search ............ 137/526, 587, 588, 589,
137/493, 493.1, 493.6, 493.8, 493.9

[56] References Cited

U.S. PATENT DOCUMENTS

| | | | |
|---|---|---|---|
| 1,578,766 | 3/1926 | Schwemlein | 137/526 |
| 1,923,503 | 8/1933 | Raines | 137/493.8 |
| 1,973,258 | 9/1934 | Jensen | 137/493.6 |
| 2,169,410 | 8/1939 | Drane | 137/526 |
| 2,183,448 | 12/1939 | Drane | 137/493.6 |
| 2,452,612 | 11/1948 | Swenberg | 137/526 X |
| 4,278,107 | 7/1981 | Dugge et al. | 137/526 |

Primary Examiner—Robert G. Nilson
Attorney, Agent, or Firm—Henry W. Cummings

[57] ABSTRACT

A combination vacuum relief valve and pressure relief valve assembly includes a top cover plate which is movable vertically to vent a predetermined pressure in the tank above atmospheric. The top cover plate is resiliently mounted with springs which resiliently bias the cover into the closed position to determine the pressure at which the top cover plate moves to vent pressure in the tank. The vacuum relief valve is located below the top cover plate. First passageways provide fluid communication between the outside atmosphere and the lower surface of the vacuum relief valve. Second passageways provide fluid communication between the top surface of the vacuum relief valve, the bottom surface of the top cover plate and the interior of the tank. When the pressure in the tank is below atmospheric, atmospheric pressure acting on the lower surface of the vacuum relief valve lifts the vacuum relief valve to allow air to enter the tank through the first and second passageways until the pressure in the tank reaches atmospheric. When the pressure in the tank exceeds atmospheric, the top cover plate is lifted by this excess above atmospheric to vent pressure in the tank until near atmospheric pressure is reached, when the top cover plate returns to its original position.

10 Claims, 5 Drawing Figures

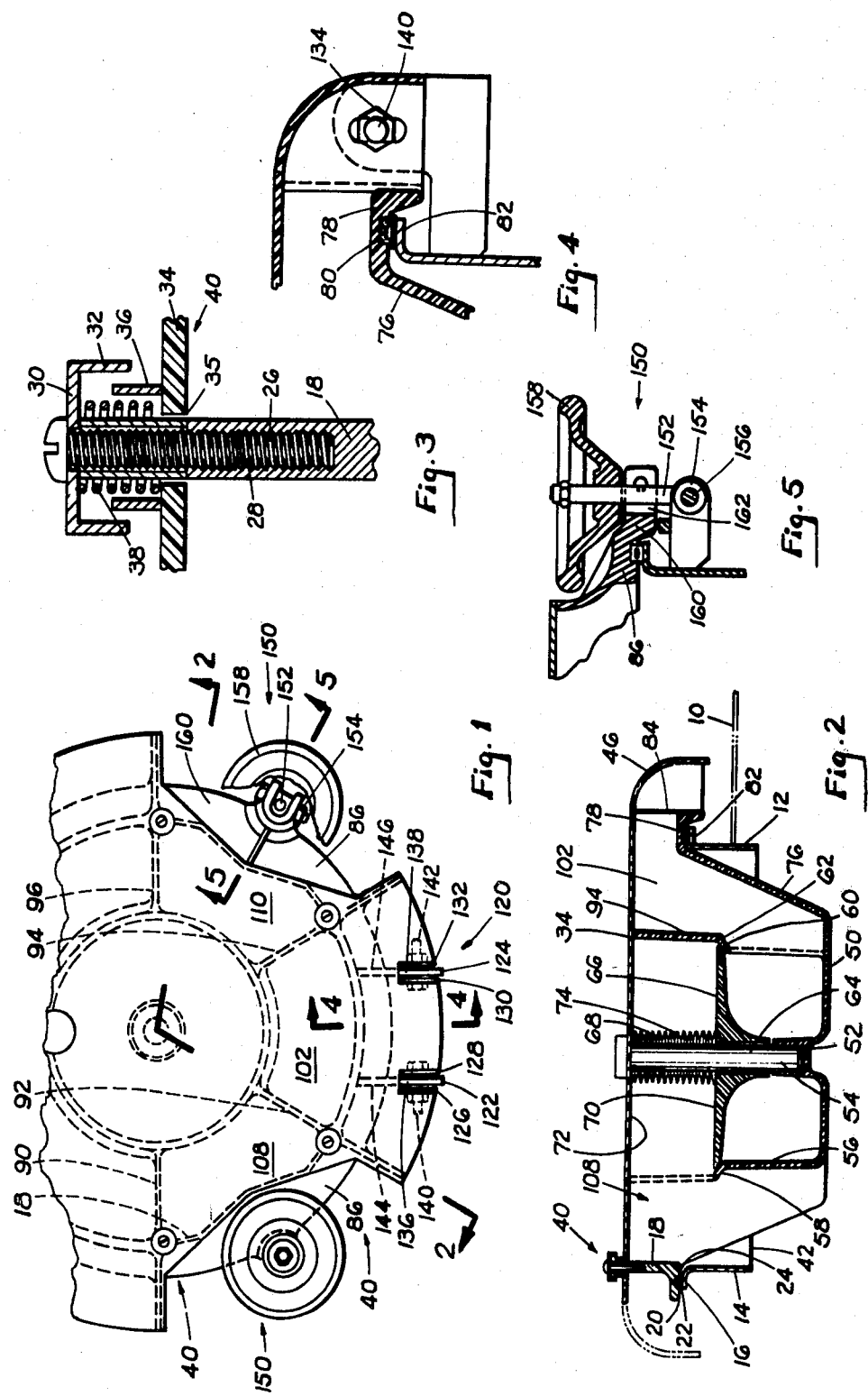

COMBINATION VACUUM RELIEF VALVE AND PRESSURE RELIEF VALVE

BACKGROUND OF THE INVENTION

U.S. Pat. No. 1,578,766 discloses a combination vacuum relief valve and pressure relief valve in which both the vacuum relief valve and the pressure relief valve are located below a top cover plate. A bottom cover plate is movable vertically to relieve a predetermined pressure in the tank above atmospheric.

In application Ser. No. 150,469 filed May 16, 1980 a vacuum relief valve is disclosed in which first passageways providing communication between the outside atmosphere and the lower surface of the vacuum relief valve have a cross-sectional area equal to the cross-sectional area of second passageways providing fluid communication between the top surface of the vacuum relief valve and the inside of the container. In this way the volume of air flow into the container is maximized for a given vacuum relief valve cross-sectional area and pressure drop between the outside atmosphere and the pressure in the tank.

In U.S. Pat. No. 2,169,410 a bottom cover plate is lifted to vent pressure in the tank to atmospheric. A vacuum relief valve is provided in this cover plate which moves downwardly to allow air to enter the tank, and which is weighted to control the vacuum relief pressure. However, the volume of air flow is not maximized in this construction.

SUMMARY OF THE INVENTION

A combination vacuum relief valve and pressure relief valve assembly includes a top cover plate which is movable vertically to vent a predetermined pressure in the tank above atmospheric. The top cover plate is resiliently mounted with springs which resiliently bias the cover into the closed position and which determine the pressure at which the top cover plate moves to vent pressure in the tank. The vacuum relief valve is located below the top cover plate. First passageways provide fluid communication between the outside atmosphere and the lower surface of the vacuum relief valve. Second passageways provide fluid communication between the top surface of the vacuum relief valve, the bottom surface of the top cover plate and the interior of the tank. When the pressure in the tank is below atmospheric, atmospheric pressure acting on the lower surface of the vacuum relief valve lifts the vacuum relief valve to allow air to enter the tank through the first and second passageways until the pressure in the tank reaches atmospheric. When the pressure in the tank exceeds atmospheric, the top cover plate is lifted by this excess above atmospheric to vent pressure in the tank until near atmospheric pressure is reached, when the top cover plate returns to its original position. Preferably the cross-sectional area of the first passageways and the second passageways throughout their length are at least equal to the cross-sectional area of the vacuum valve to maximuze flow into the container.

IN THE DRAWINGS

FIG. 1 is a partial plan view of the combination vacuum relief valve and pressure relief valve assembly of the present invention.

FIG. 2 is a vertical sectional view looking in the direction of the arrows along the line 2—2 in FIG. 1.

FIG. 3 is a detail view of one of the spring assemblies used to allow the cover to vent pressure within the tank.

FIG. 4 is a vertical sectional view looking in the direction of the arrows along the line 4—4 in FIG. 1.

FIG. 5 is a vertical sectional view looking in the direction of the arrows along the line 5—5 in FIG. 1.

DESCRIPTION OF PREFERRED EMBODIMENTS

A railway car roof 10 is provided with an opening 12 into which is welded a cylindrical hatch cover coaming 14. The coaming includes an out-turned flange portion 16. A cylindrical cover support 18 includes an outwardly extending flange portion 20 having a slot 22 into which is inserted an elastomeric seal 24 which in closed position rests on coaming flange 16. Cover support 18 includes openings 26 into which are inserted fasteners 28 which hold in place spring guides 30. Spring guides 30 are generally circular and include a cylindrical depending portions 32.

A top cover plate 34 is provided with spring openings 35 and a plurality of upstanding stops 36 located within spring guide 30. Located within circular stops 36 are coil springs 38, to define a resilient mounting assembly 40. A plurality of such cover resilient mounting assemblies 40 are provided about the cover as illustrated in FIG. 1.

It will be apparent that the interior of the coaming 14 is in communication with the interior of the tank. Therefore, when the pressure within the tank 42 exceeds atmospheric pressure and the bias of coil springs 38, the top cover plate 34 will be lifted.

The cover plate includes depending arcuate edge portions 46 which are downturned. A bottom cover plate 50 has an opening 52 to receive a vertically extending pin 54. Vertical webs 56 extend upwardly from bottom cover plate 50 and include out-turned portion 58 which define in part a valve seat 60. Valve seat 60 is also defined in part by inwardly turned projections 62 on depending webs 44. A bushing 64 is provided around pin 54 and a valve member 66 is provided which rests on seat 60. A spring 68 is provided extending between the upper surface 70 of the valve member 66 and the lower surface 72 of the plate 34. A bellows 74 provides a protective covering for spring 68.

Bottom plate extensions 76 extend upwardly and outwardly from bottom plate 50 and include a flange portion 78 containing a slot 80 which receives a seal 82 which rests upon coaming flange 16. A screen 84 extends upwardly from flange portion 78 and supports cover 34 in closed position. Screen 84 prevents foreign matter from entering the passageway from the outside atmosphere through the lower surface of valve 66. Cover supports 86 are also provided at the edge of the cover as shown in FIG. 5.

It will be seen from FIG. 1 that a plurality of radially extending walls 90, 92, 94 and 96 are provided. These walls define a plurality of first passages 102 extending from the outside atmosphere down to the lower surface of valve member 66. As mentioned above, it is preferred to provide the screens 84 which prevent foreign material from entering these passageways.

At the same time a plurality of second passageways 108 and 110 are provided which provide fluid communication between the tank 42 and the upper surface 70 of valve 66, and the lower surface 72 of top cover plate 34. Reference may be made to application Ser. No. 150,469 filed May 16, 1980, now U.S. Pat. No. 4,323,096, for a more detailed description of these passageways relative to the operation of valve member 66. It is sufficient for an understanding of the present invention to point out that the cross-sectional area of the first passageways 102 and the cross-sectional area of the second passageways 108 and 110 are substantially equal to the cross-sectional area of the valve. Thus when the pressure inside the tank becomes below atmospheric which pressure is present upon the upper surface 70 of the valve 66, the pressure of the outside atmosphere acting upon the lower surface 67 of the valve 66 causes the valve to raise and for air to flow through the first passageways 92 and into the second passageways 108, 110 and into the container until the pressure within the container is equal to atmospheric pressure. At that time valve 66 returns to its original seated position aided by spring 68.

When the pressure within container 42 exceeds extends atmospheric pressure, second passageways 108 and 110 provide fluid communication between the tank and top cover plate 34. If this pressure exceeds atmospheric pressure and the bias of coil springs 38, the cover plate 34 is lifted and gases within the tank can exit between the top cover plate and the supports 90, 92, 94 and 96 to relieve pressure in the tank. When the pressure in the tank becomes sufficiently close to atmospheric that the combination of the weight of the cover plate and the bias ofspring 38 exceed this pressure, the cover plate returns to its seated position.

A hinge assembly 120 includes a pair of hinge plates 122 and 124 which are welded to the tank top. Laterally spaced cover plates 126, 128, 130 and 132 are provided on either side of the plates 122 and 124. Cover plates 126, 128, 130 and 132 are provided with vertically elongated slots, one of which is illustrated at 134 in FIG. 6. Fasteners 136 and 138 each including fastening nuts 140 and 142 extend respectively through plates 128, 122 and 126 and 130, 124 and 132. When the cover 34 lifts to vent the pressure within the tank, the plates 126, 128, 130 and 132 move vertically relative to pins 136 and 138 by virtue of slots 134.

It will be apparent that the hinge plates 122 and 124 include respective extensions 144 and 146 which extend into the body portion of the cover assembly and pivot the entire assembly whereby the cover and body portion may be rotated to open position relative to the coaming flange 16.

A plurality of latch assemblies 150 are provided rotated circumferentially about the cover. One of these latch assemblies is illustrated in the same way. Latch assembly 150 includes a shaft 152 which includes a collar 154 which is rotatably mounted about a pin 156. Shaft 152 is threaded and has a threaded wheel 158 located thereon. Cover support 86 has an outwardly extending portion 160 which includes a slot 162 to receive the pin 152. In closed position the handle 152 engages the upper surface of the extension portion 160. To open the latch the handle 158 is rotated sufficiently for the extending portion 160 to clear. Then the shaft 152 is pivoted about the pin 162 and the shaft rotates 90 degrees and rests upon the car roof 12. Then the pressure relief valve and vacuum relief valve assembly can then be pivoted about pins 136 and 138 to the open position to allow loading of the car through the coaming 14. After the car is loaded, the pressure relief valve and vent valve assembly is rotated to the closed position about hinge pins 136 and 138. All of shafts 152 are rotated to their vertical positions, and the handles 158 turn down to hold the assembly in the closed and seated position with the elastomeric seal engaging the coaming flange 16. The cover plate is then in position to vent excess pressure in the tank and the valve member 70 is in position to provide a vacuum relief valve in the event the pressure in the tank goes below atmospheric.

What is claimed is:

1. A combination vacuum relief valve and pressure relief valve assembly for use in a tank comprising: cover plate support means extending upwardly from fixed structure on a railway tank car; resilient means biasing a top cover plate into engaged position with said support means; said cover plate being movable between a closed position engaging said support means and preventing fluid communication between the tank and the outside atmosphere, and an open position wherein said cover plate moves upwardly against the bias of said resilient means, and wherein fluid communication is permitted between the tank and the outside atmosphere; a vacuum relief valve mounted horizontally and spaced below said top cover plate; means biasing said valve into closed position engaging a valve seat located below said top cover plate and below said valve; said valve in said closed position closing communication between the inside of the tank and the outside atmosphere, and in open position allowing communication between the tank and the outside atmosphere; a plurality of first passageways providing fluid communication between the lower surface of the valve and the outside atmosphere; a plurality of second passageways spaced from said first passageways providing fluid communication between the inside of the tank and the upper surface of said valve when said valve is in closed position; said first and second passageways being located below said top cover plate; the cross sectional area of said first passageways throughout their length being at least substantially equal to the cross sectional area of said valve and the cross sectional area of said second passageways through their length being at least substantially equal to the cross sectional area of said valve; whereby when the pressure inside the tank becomes less than atmospheric pressure, atmospheric pressure will cause the valve to move upwardly away from its seat and allow air to enter the tank and whereby when the pressure in the atmosphere and in the tank are substantially equalized, the valve will return to the seated position; and whereby for a given available valve cross sectional area the volume of air flow into the tank from the atmosphere is maximized for a given pressure drop from the atmosphere into the container.

2. Combination vacuum relief and pressure relief valve assembly according to claim 1, wherein a plurality of springs are provided which bias said cover into the closed position.

3. Combination vacuum relief valve and pressure relief valve assembly according to claim 2, wherein said springs are threaded into fixed portions of said assembly and wherein stop means are provided which engage when the cover is in open position.

4. Combination vacuum relief valve and pressure relief valve assembly according to claim 3, wherein said stop means comprise an abutment on the cover which engages a cap located above the spring.

5. Combination vacuum relief valve and pressure relief valve assembly according to claim 1, wherein said cover plate is pivotably mounted about bracket means attached to a railway car roof and wherein said cover plate is provided with extensions containing slots which receive pins from said bracket means.

6. Combination vacuum relief valve and pressure relief valve assembly according to claim 5, wherein said extensions are provided with elongated slots to enable said cover to move into a position to vent pressure within the tank.

7. Combination vacuum relief valve and pressure relief valve assembly according to claim 6, wherein a plurality of latch members are provided on said car roof which hold said assembly closed position.

8. Combination vacuum relief valve and pressure relief valve assembly according to claim 7, wherein said cover plate is movable to open position to vent pressure in the tank when said latch members are in closed position.

9. Combination vacuum relief valve and pressure relief valve assembly according to claim 7, wherein said combination assembly is located in a railway car hatch cover.

10. Combination vacuum relief valve and pressure relief valve assembly according to claim 1, wherein screen means are provided in said first passageways to prevent foreign articles from entering said first passageways and damaging said vacuum valve.

* * * * *